United States Patent
Tosomboon

(10) Patent No.: US 11,597,835 B2
(45) Date of Patent: Mar. 7, 2023

(54) THERMOPLASTIC COMPOSITION HAVING A COEFFICIENT OF THERMAL EXPANSION CLOSELY MATCHED TO ALUMINUM

(71) Applicant: SHPP GLOBAL TECHNOLOGIES B.V., Bergen op Zoom (NL)

(72) Inventor: Monchai Tosomboon, Selkirk, NY (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 17/622,904

(22) PCT Filed: Jun. 11, 2020

(86) PCT No.: PCT/IB2020/055494
§ 371 (c)(1),
(2) Date: Dec. 27, 2021

(87) PCT Pub. No.: WO2020/261024
PCT Pub. Date: Dec. 30, 2020

(65) Prior Publication Data
US 2022/0267594 A1    Aug. 25, 2022

(30) Foreign Application Priority Data
Jun. 28, 2019 (EP) .................................. 19183238

(51) Int. Cl.
C08L 69/00 (2006.01)
B29C 48/00 (2019.01)
C08K 7/14 (2006.01)
C08L 25/12 (2006.01)

(52) U.S. Cl.
CPC ............ C08L 69/00 (2013.01); B29C 48/022 (2019.02); C08K 7/14 (2013.01); C08L 25/12 (2013.01); C08K 2201/014 (2013.01); C08L 2203/20 (2013.01); C08L 2203/30 (2013.01)

(58) Field of Classification Search
None
See application file for complete search history.

(56) References Cited

U.S. PATENT DOCUMENTS

| | | |
|---|---|---|
| 8,779,033 B2 | 7/2014 | Seidel et al. |
| 2013/0196131 A1* | 8/2013 | Malinoski .............. C08K 5/526 523/466 |
| 2013/0253092 A1* | 9/2013 | Seidel .................. C08L 69/005 523/436 |
| 2014/0193595 A1* | 7/2014 | Chang ................. B29C 45/0055 428/34.5 |
| 2015/0025180 A1 | 1/2015 | Monden |

FOREIGN PATENT DOCUMENTS

| | | |
|---|---|---|
| CN | 105264017 A | 1/2016 |
| CN | 106459564 A | 2/2017 |
| JP | 2007070468 A | 3/2007 |
| JP | 2008231441 | * 10/2008 |

OTHER PUBLICATIONS

Machine translation of Tusunoda (JP 2008231441) (Year: 2008).*
International Search Report and Written Opinion dated Sep. 18, 2020 in PCT/IB2020/055494 (9 pgs.).

* cited by examiner

Primary Examiner — Robert T Butcher
(74) Attorney, Agent, or Firm — Quicker Law, LLC

(57) ABSTRACT

A thermoplastic composition includes from about 40 wt % to about 60 wt % polycarbonate homopolymer or copolymer, from about 15 wt % to about 30 wt % styrene acrylonitrile copolymer, from about 13 wt % to about 15 wt % flat glass fiber, and from about 9 wt % to about 11 wt % round glass fiber. Methods for making a thermoplastic composition include forming a mixture from the recited components and extruding or molding the mixture to form the composition.

15 Claims, No Drawings

THERMOPLASTIC COMPOSITION HAVING A COEFFICIENT OF THERMAL EXPANSION CLOSELY MATCHED TO ALUMINUM

CROSS-REFERENCE TO RELATED APPLICATION

This application is the National Stage of International Application No. PCT/IB2020/055494 filed Jun. 11, 2020, which claims priority to and the benefit of European Application No. 19183238.5 filed Jun. 28, 2019, the disclosures of which are incorporated herein by this reference in their entireties.

FIELD OF THE DISCLOSURE

The present disclosure relates to thermoplastic compositions, and more particularly to thermoplastic compositions having a coefficient of thermal expansion that is closely matched to that of aluminum.

BACKGROUND OF THE DISCLOSURE

In numerous applications there is a desire to replace metal components with polymer components to minimize component weight. Aluminum is one such metal. While various metal and polymer substitutes for aluminum have been used, they can have properties that make them unsuitable for substitution in certain applications. For example, in certain applications it may be necessary to closely match the coefficient of thermal expansion (CTE) of the polymer to that of aluminum (approximately 23-26 micron per meter per degree Celsius ($\mu$m/m/° C.)), such as in polymer/aluminum bonding applications. If the CTE of the polymer is substantially different from that of aluminum the bond could weaken or fail. Conventional polymer substitutes either have a CTE that widely varies from that of aluminum and/or that has a flowability (melt flow rate (MFR) or melt volume flow rate (MVR)) that makes them unsuitable for certain molding applications.

These and other shortcomings are addressed by aspects of the present disclosure.

SUMMARY

Aspects of the disclosure relate to a thermoplastic composition, including: from about 40 wt % to about 60 wt % polycarbonate homopolymer or copolymer; from about 15 wt % to about 30 wt % styrene acrylonitrile copolymer; from about 13 wt % to about 15 wt % flat glass fiber; and from about 9 wt % to about 11 wt % round glass fiber. The combined weight percent value of all components does not exceed 100 wt %, and all weight percentage values are based on the total weight of the composition.

Aspects of the disclosure further relate to a method for making a thermoplastic composition, including: forming a mixture including from about 40 wt % to about 60 wt % polycarbonate homopolymer or copolymer, from about 15 wt % to about 30 wt % styrene acrylonitrile copolymer, from about 13 wt % to about 15 wt % flat glass fiber, and from about 9 wt % to about 11 wt % round glass fiber; and extruding or molding the mixture to form the composition. The combined weight percent value of all components does not exceed 100 wt %, and all weight percentage values are based on the total weight of the composition.

DETAILED DESCRIPTION

The present disclosure can be understood more readily by reference to the following detailed description of the disclosure and the Examples included therein. In various aspects, the present disclosure pertains to thermoplastic compositions and methods for making them that include: from about 40 wt % to about 60 wt % polycarbonate homopolymer or copolymer; from about 15 wt % to about 30 wt % styrene acrylonitrile copolymer; from about 13 wt % to about 15 wt % flat glass fiber; and from about 9 wt % to about 11 wt % round glass fiber. The combined weight percent value of all components does not exceed 100 wt %, and all weight percentage values are based on the total weight of the composition. The thermoplastic compositions have good melt flow properties and a coefficient of thermal expansion (CTE) that closely matches that of aluminum.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "Mn" can be used interchangeably, and refer to the statistical average molecular weight of all the polymer chains in the sample and is defined by the formula:

$$M_n = \frac{\sum N_i M_i}{\sum N_i},$$

where Mi is the molecular weight of a chain and Ni is the number of chains of that molecular weight. Mn can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\sum N_i M_i^2}{\sum N_i M_i},$$

where Mi is the molecular weight of a chain and Ni is the number of chains of that molecular weight. Compared to Mn, Mw takes into account the molecular weight of a given chain in determining contributions to the molecular weight average. Thus, the greater the molecular weight of a given chain, the more the chain contributes to the Mw. Mw can be determined for polymers, e.g., polycarbonate polymers, by methods well known to a person having ordinary skill in the art using molecular weight standards, e.g., polycarbonate standards or polystyrene standards, preferably certified or traceable molecular weight standards.

The terms "BisA," "BPA," or "bisphenol A," which can be used interchangeably, as used herein refers to a compound having a structure represented by the formula:

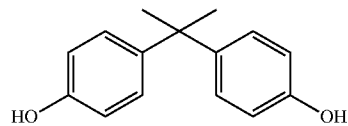 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to a thermoplastic composition, including: from about 40 wt % to about 60 wt % polycarbonate homopolymer or copolymer; from about 15 wt % to about 30 wt % styrene acrylonitrile copolymer; from about 13 wt % to about 15 wt % flat glass fiber; and from about 9 wt % to about 11 wt % round glass fiber. The combined weight percent value of all components does not exceed 100 wt %, and all weight percentage values are based on the total weight of the composition.

In one aspect, the polycarbonate can include any polycarbonate material or mixture of materials, for example, as recited in U.S. Pat. No. 7,786,246, which is hereby incorporated in its entirety for the specific purpose of disclosing various polycarbonate compositions and methods. The term polycarbonate can be further defined as compositions having repeating structural units of the formula (1):

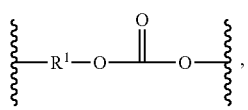

(1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

In addition to the polycarbonates described above, combinations of the polycarbonate with other thermoplastic polymers, for example combinations of homopolycarbonates and/or polycarbonate copolymers, can be used.

Polycarbonates, including isosorbide-based polyester-polycarbonate, can include copolymers including carbonate units and other types of polymer units, including ester units, and combinations including at least one of homopolycarbonates and copolycarbonates. An exemplary polycarbonate copolymer of this type is a polyester carbonate, also known as a polyester-polycarbonate or polyester carbonate. Such copolymers further contain carbonate units derived from oligomeric ester-containing dihydroxy compounds (also referred to herein as hydroxy end-capped oligomeric acrylate esters).

In various further aspects, "polycarbonates" and "polycarbonate resins" as used herein further include homopolycarbonates, copolymers including different $R^1$ moieties in the carbonate (referred to herein as "copolycarbonates"), copolymers including carbonate units and other types of polymer units, such as ester units, polysiloxane units, and combinations including at least one of homopolycarbonates and copolycarbonates. As used herein, "combination" is inclusive of blends, mixtures, alloys, reaction products, and the like.

In a further aspect, the polycarbonate resin includes a polyester-polycarbonate copolymer, and specifically a polyester-polycarbonate copolymer including ester units that include soft block ester units, also referred to herein as aliphatic dicarboxylic acid ester units. Such a polyester-polycarbonate copolymer including soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and can be straight chain (i.e., unbranched) or branched chain dicarboxylic acids, cycloalkyl or cycloalkylidene-containing dicarboxylic acids units, or combinations of these structural units. In a still further aspect, the $C_{6-20}$ aliphatic dicarboxylic acid ester unit includes a straight chain alkylene group including methylene (—CH$_2$—) repeating units.

All types of polycarbonate end groups are contemplated as being useful in the polycarbonate composition, provided that such end groups do not significantly adversely affect desired properties of the compositions.

In a further aspect, the polycarbonate polymer is a homopolymer. In a still further aspect, the homopolymer includes repeating units derived from bisphenol A.

In a still further aspect, the polycarbonate component is a copolymer. In a still further aspect, the copolymer includes repeating units derived from BPA. In yet a further aspect, the copolymer includes repeating units derived from sebacic acid. In an even further aspect, the copolymer includes repeating units derived from sebacic acid and BPA. Useful polycarbonate copolymers are commercially available and include, but are not limited to, those marketed under the trade names LEXAN™ EXL and LEXAN™ HFD polymers, and are available from SABIC Innovative Plastics (formerly GE Plastics).

In a particular aspect the polycarbonate is an Optical grade LEXAN™ polycarbonate homopolymer (OQPC), available from SABIC.

In some aspects the polycarbonate homopolymer or copolymer has a molecular weight of 1,500 to 100,000 grams per mole (g/mol) as determined by gel permeation chromatography (GPC) and calibrated to polycarbonate standards. In further aspects the polycarbonate homopolymer or copolymer has a molecular weight of 10,000 to 50,000 g/mol, or a molecular weight of 15,000 to 25,000 g/mol, as determined by gel permeation chromatography (GPC) and calibrated to polycarbonate standards.

The thermoplastic composition includes from about 40 wt % to about 60 wt % polycarbonate homopolymer or copolymer. In a further aspect the thermoplastic composition includes from about 50 wt % to about 55 wt % polycarbonate homopolymer or copolymer.

Styrene acrylonitrile copolymer is a copolymer of styrene and acrylonitrile, and has the chemical structure shown in formula (3):

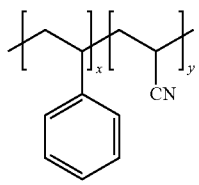

(3)

The content of styrene and acrylonitrile may be varied. In some aspects the SAN copolymer includes from about 60-90 wt % styrene and from about 10-40 wt % acrylonitrile, or in certain aspects from about 70-80 wt % styrene and from about 20-30 wt % acrylonitrile. In a particular aspect the SAN copolymer can be styrene acrylonitrile copolymer, Grade 29355, available from SABIC.

The thermoplastic composition may include from about 15 wt % to about 30 wt % styrene acrylonitrile copolymer in some aspects, or in particular aspects from about 20 wt % to about 25 wt % styrene acrylonitrile copolymer.

The glass fibers in the thermoplastic compositions may be any suitable type of glass fiber. In some aspects the glass fiber is selected from E-glass, S-glass, AR-glass, T-glass, D-glass and R-glass. In a still further aspect, the glass fiber is selected from E-glass, S-glass, and combinations thereof. In a still further aspect, the glass fiber is one or more S-glass materials. High-strength glass is generally known as S-type glass in the United States, R-glass in Europe and T-glass in Japan. S-glass was originally developed for military applications in the 1960s, and a lower cost version, S-2 glass, was later developed for commercial applications. High-strength glass has appreciably higher amounts of silica oxide, aluminum oxide and magnesium oxide than E-glass. S-2 glass is approximately 40-70% stronger than E-glass. The glass fibers can be made by standard processes, e.g., by steam or air blowing, flame blowing, and mechanical pulling. Exemplary glass fibers for thermoplastic compositions of the present disclosure may be made by mechanical pulling.

The glass fibers may be sized or unsized. Sized glass fibers are coated on their surfaces with a sizing composition selected for compatibility with the polymeric base resin. The sizing composition facilitates wet-out and wet-through of the polymeric base resin upon the fiber strands and assists in attaining desired physical properties in the thermoplastic composition.

In various further aspects, the glass fiber is sized with a coating agent. In a further aspect, the coating agent is present in an amount from about 0.1 wt % to about 5 wt % based on the weight of the glass fibers. In a still further aspect, the coating agent is present in an amount from about 0.1 wt % to about 2 wt % based on the weight of the glass fibers.

The thermoplastic composition includes a combination of flat glass fibers and round glass fibers. In one aspect the thermoplastic composition includes from about 13 wt % to about 15 wt % flat glass fiber; and from about 9 wt % to about 11 wt % round glass fiber. In a particular aspect the thermoplastic composition includes about 14 wt % flat glass fiber and about 10 wt % round glass fiber. An exemplary flat glass fiber is a flat E-glass fiber, such as CSG3PA-830 available from Nittobo. An exemplary round glass fiber is Type 3540 round glass fiber, available from PPG Industries. The specific content of flat glass fiber and round glass fiber as described herein may provide the thermoplastic composition with particularly desirable properties, including but not limited to good flowability and a CTE that closely matches that of aluminum.

In addition to the foregoing components, the disclosed thermoplastic compositions may optionally include one or more additional additive materials ordinarily incorporated in polycarbonate resin compositions of this type, with the proviso that the additives are selected so as to not significantly adversely affect the desired properties of the thermoplastic compositions described herein. Combinations of additives can be used. Exemplary and non-limiting examples of additive materials that can be present in the disclosed molded article include reinforcing fillers, acid scavengers, anti-drip agents, antioxidants, antistatic agents, chain extenders, colorants (e.g., pigment and/or dye), de-molding agents, flow promoters, lubricants, mold release agents, plasticizers, quenching agents, flame retardant stabilizers (including for example a thermal stabilizer, a hydrolytic stabilizer, or a light stabilizer), UV reflecting additives, or any combination thereof.

The thermoplastic compositions described herein have a coefficient of thermal expansion (CTE) that closely matches that of aluminum. In some aspects the thermoplastic composition has a CTE of from 22 to 29 micron per meter per degree Celsius (μm/m/° C.) as determined in accordance with ISO 11359. In further aspects the thermoplastic composition has a coefficient of thermal expansion of from 23 to 27 μm/m/° C. as determined in accordance with ISO 11359. Thermoplastic compositions having a CTE that closely matches that of aluminum may be suitable as replacements or partial replacements for aluminum components. In addition, they may be bonded to or otherwise combined with aluminum in some constructions, as both the aluminum and the thermoplastic composition will expand and contract at similar rates with a change in temperature.

Thermoplastic compositions according to aspects of the disclosure may also have good flowability, as measured by melt flow rate (MFR). In some aspects the thermoplastic composition has a MFR of at least 30 cubic centimeters per 10 minutes ($cm^3$/10 min) as tested in accordance with ISO 1133. In further aspects the thermoplastic composition has a MFR of at least 35 $cm^3$/10 min as tested in accordance with ISO 1133. In yet further aspects the thermoplastic composition has a MFR of at least 30 $cm^3$/10 min, or from 30-70 $cm^3$/10 min, or from 30-60 $cm^3$/10 min, or from 35-60 $cm^3$/10 min, all as tested in accordance with ISO 1133. Good flowability/MFR properties allow the thermoplastic composition to be molded and/or extruded into more complex forms.

Methods for Making Thermoplastic Compositions

Aspects of the disclosure further relate to methods for making the thermoplastic compositions, including: forming a mixture including from about 40 wt % to about 60 wt % polycarbonate homopolymer or copolymer, from about 15 wt % to about 30 wt % styrene acrylonitrile copolymer, from about 13 wt % to about 15 wt % flat glass fiber, and from about 9 wt % to about 11 wt % round glass fiber; and extruding or molding the mixture to form the composition. The combined weight percent value of all components does not exceed 100 wt %, and all weight percentage values are based on the total weight of the composition.

The one or any foregoing components described herein may be first dry blended with each other, or dry blended with any combination of foregoing components, then fed into an extruder from one or multi-feeders, or separately fed into an extruder from one or multi-feeders. The fillers used in the invention may also be first processed into a masterbatch, then fed into an extruder. The components may be fed into the extruder from a throat hopper or any side feeders.

The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations comprising at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations comprising at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

The thermoplastic composition formed according to the describe methods may include any of the components and in the amounts described herein, and may have any of the properties described herein.

Articles of Manufacture

In certain aspects, the present disclosure pertains to shaped, formed, or molded articles comprising the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded.

In certain aspects the article is a housing for a personal or commercial electronics device. In particular aspects the housing includes the thermoplastic composition and an aluminum component, and the thermoplastic composition is bonded to the aluminum component. The closely matched CTEs of the thermoplastic composition and the aluminum component allow both components to expand and contract at substantially the same rate when heated and/or cooled.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of:
from about 40 wt % to about 60 wt % polycarbonate homopolymer or copolymer;
from about 15 wt % to about 30 wt % styrene acrylonitrile copolymer;
from about 13 wt % to about 15 wt % flat glass fiber; and
from about 9 wt % to about 11 wt % round glass fiber,
wherein the combined weight percent value of all components does not exceed 100 wt %, and all weight percentage values are based on the total weight of the composition.

Aspect 2. The thermoplastic composition according to Aspect 1, comprising about 50 wt % to about 55 wt % polycarbonate homopolymer or copolymer and about 20 wt % to about 25 wt % styrene acrylonitrile copolymer.

Aspect 3. The thermoplastic composition according to Aspect 1 or 2, comprising about 14 wt % flat glass fiber and about 10 wt % round glass fiber.

Aspect 4. The thermoplastic composition according to any of Aspects 1 to 3, wherein the composition has a coefficient of thermal expansion of from 22 to 29 micron per meter per degree Celsius (μm/m/° C.) as determined in accordance with ISO 11359.

Aspect 5. The thermoplastic composition according to any of Aspects 1 to 4, wherein the composition has a coefficient of thermal expansion of from 23 to 27 μm/m/° C. as determined in accordance with ISO 11359.

Aspect 6. The thermoplastic composition according to any of Aspects 1 to 5, wherein the composition has a melt flow rate (MFR) of at least 30 cubic centimeters per 10 minutes ($cm^3$/10 min) as tested in accordance with ISO 1133.

Aspect 7. The thermoplastic composition according to any of Aspects 1 to 6, wherein the composition has a melt flow rate (MFR) of at least 35 $cm^3$/10 min as tested in accordance with ISO 1133.

Aspect 8. The thermoplastic composition according to any of Aspects 1 to 7, wherein the polycarbonate homopolymer or copolymer has a molecular weight of 1,500 to 100,000 g/mol as determined by gel permeation chromatography (GPC) and calibrated to polycarbonate standards.

Aspect 9. An article comprising the thermoplastic composition according to any of Aspects 1 to 8.

Aspect 10. The article according to Aspect 9, wherein the article is a housing for a personal or commercial electronics device.

Aspect 11. The article according to Aspect 10, wherein the housing comprises the thermoplastic composition and an aluminum component, and wherein the thermoplastic composition is bonded to the aluminum component.

Aspect 12. A method for making a thermoplastic composition comprising, consisting of, or consisting essentially of:

forming a mixture comprising from about 40 wt % to about 60 wt % polycarbonate homopolymer or copolymer, from about 15 wt % to about 30 wt % styrene acrylonitrile copolymer, from about 13 wt % to about 15 wt % flat glass fiber, and from about 9 wt % to about 11 wt % round glass fiber; and extruding or molding the mixture to form the composition, wherein the combined weight percent value of all components does not exceed 100 wt %, and all weight percentage values are based on the total weight of the composition.

Aspect 13. The method according to Aspect 12, wherein the mixture comprises about 50 wt % to about 55 wt % polycarbonate homopolymer or copolymer, about 20 wt % to about 25 wt % styrene acrylonitrile copolymer, about 14 wt % flat glass fiber and about 10 wt % round glass fiber.

Aspect 14. The method according to Aspect 12 or 13, wherein the composition has a coefficient of thermal expansion of from 23 to 27 micron per meter per degree Celsius (μm/m/° C.) as determined in accordance with ISO 11359, and the composition has a melt flow rate (MFR) of at least 35 cm³/10 min as tested in accordance with ISO 1133.

Aspect 15. The method according to any of Aspects 12 to 14, wherein the polycarbonate homopolymer or copolymer has a molecular weight of 1,500 to 100,000 g/mol as determined by gel permeation chromatography (GPC) and calibrated to polycarbonate standards.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Components used in the described compositions are provided in Table 1:

TABLE 1

| Component | Description | Source |
|---|---|---|
| OQ PC | Optical grade LEXAN ™ polycarbonate, MW 18,000-18,400 | SABIC |
| SAN | Styrene acrylonitrile copolymer, Grade 29355 | SABIC |
| HF PC | High flow polycarbonate, MW 21,800-22,2000 | SABIC |
| Mica | 60 micron | AmeriChem |
| Flat Glass | Flat E-glass fiber, CSG3PA-830 | Nittobo |
| Round Glass | Type 3540 round glass fiber | PPG Industries |
| Stabilizer | Irganox ® 1010 phosphite stabilizer | Addivant UK |
| Mold Release | Pentaerythritol tetrastearate (PETS) | FACI S.p.A |

Various polymer compositions were made and tested for CTE and flowability (MFR). Results are shown in Tables 2A and 2B:

TABLE 2A

| | Unit | C1 | C2 | C3 | C4 | C5 |
|---|---|---|---|---|---|---|
| Item Description | | | | | | |
| OQ PC | % | 79.8 | 75.6 | 71.8 | 81.7 | 75.8 |
| SAN | % | — | — | — | — | — |
| HF PC | % | — | — | — | — | — |
| Mica | % | — | — | — | 4 | 10 |
| Flat Glass | % | 16 | 14 | 14 | 14 | 14 |
| Round Glass | % | 4 | 10 | 14 | — | — |
| Stabilizer | % | 0.05 | 0.05 | 0.05 | 0.05 | 0.05 |
| Mold Release | % | 0.2 | 0.2 | 0.2 | 0.2 | 0.2 |
| Properties | | | | | | |
| CTE | μm/m/° C. | 31.2 | 34.2 | 21.4 | 34.7 | 32.4 |
| MFR | cm³/10 min | 19.2 | 16.6 | 15.6 | — | 14.0 |

TABLE 2B

| Item Description | Unit | Ex1 | Ex2 | Ex3 | Ex4 |
|---|---|---|---|---|---|
| OQ PC | % | 37.9 | 53.0 | 37.9 | 53.0 |
| SAN | % | — | — | 37.9 | 22.7 |
| HF PC | % | 37.9 | 22.7 | — | — |
| Mica | % | — | — | — | — |
| Flat Glass | % | 14 | 14 | 14 | 14 |
| Round Glass | % | 10 | 10 | 10 | 10 |
| Stabilizer | % | 0.05 | 0.05 | 0.05 | 0.05 |
| Mold Release | % | 0.2 | 0.2 | 0.2 | 0.2 |
| Properties | | | | | |
| CTE | μm/m/° C. | 30.2 | 25.1 | 33.2 | 24.6 |
| MFR | cm³/10 min | 16.0 | 16.6 | 53.7 | 39.9 |

From the data it is evident that Ex2 and Ex4 including SAN or HF PC had a CTE most closely matched to that of aluminum (about 23-26 μm/m/° C.). The flowability of the composition of Ex2 (including HF PC), however, was rather low at 16.6 cm³/10 min, which could make it unsuitable for use in certain applications. The Ex4 composition had a good balance of CTE and flowability.

Based on the survey results (Tables 2A and 2B), additional compositions were made to evaluate the effect of varying amounts of flat and round glass fiber on the CTE of the compositions Results are shown in Table 3

TABLE 3

| | Unit | Ex3 | Ex4 | Ex5 | Ex6 | Ex7 | Ex8 |
|---|---|---|---|---|---|---|---|
| Item Description | | | | | | | |
| OQ PC | % | 37.9 | 53.0 | 55.8 | 57.2 | 54.4 | 51.6 |
| SAN | % | 37.9 | 22.7 | 23.9 | 24.5 | 23.3 | 22.1 |
| HF PC | % | — | — | — | — | — | — |
| Mica | % | — | — | — | — | — | — |
| Flat Glass | % | 14 | 14 | 16 | 14 | 14 | 14 |
| Round Glass | % | 10 | 10 | 4 | 4 | 8 | 12 |
| Stabilizer | % | 0.05 | 0.05 | 0.05 | 0.05 | 0.05 | 0.05 |
| Mold Release | % | 0.2 | 0.2 | 0.2 | 0.2 | 0.2 | 0.2 |
| Properties | | | | | | | |
| CTE | μm/m/° C. | 33.2 | 24.6 | 21.5 | 36.6 | 31.1 | 18.4 |
| MFR | cm³/10 min | 53.7 | 39.9 | N/A | N/A | N/A | N/A |

N/A—not evaluated

A ratio of about 70/30 PC to SAN was maintained for Ex5-Ex8. From this data it was observed that composition Ex4 had a CTE that was most closely matched to that of aluminum.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A thermoplastic composition, comprising:
   from 40 wt % to 60 wt % polycarbonate homopolymer or copolymer;
   from 15 wt % to 30 wt % styrene acrylonitrile copolymer;
   from 13 wt % to 15 wt % flat glass fiber; and
   from 9 wt % to 11 wt % round glass fiber,
   wherein the combined weight percent value of all components does not exceed 100 wt %, and all weight percentage values are based on the total weight of the composition.

2. The thermoplastic composition according to claim 1, comprising 50 wt % to 55 wt % polycarbonate homopolymer or copolymer and 20 wt % to 25 wt % styrene acrylonitrile copolymer.

3. The thermoplastic composition according to claim 1, comprising 14 wt % flat glass fiber and 10 wt % round glass fiber.

4. The thermoplastic composition according to claim 1, wherein the composition has a coefficient of thermal expansion of from 22 to 29 micron per meter per degree Celsius (μm/m/° C.) as determined in accordance with ISO 11359.

5. The thermoplastic composition according to claim 1, wherein the composition has a coefficient of thermal expansion of from 23 to 27 μm/m/° C. as determined in accordance with ISO 11359.

6. The thermoplastic composition according to claim 1, wherein the composition has a melt flow rate (MFR) of at least 30 cubic centimeters per 10 minutes (cm³/10 min) as tested in accordance with ISO 1133.

7. The thermoplastic composition according to claim 1, wherein the composition has a melt flow rate (MFR) of at least 35 cm³/10 min as tested in accordance with ISO 1133.

8. The thermoplastic composition according to claim 1, wherein the polycarbonate homopolymer or copolymer has a molecular weight of 1,500 to 100,000 g/mol as determined by gel permeation chromatography (GPC) and calibrated to polycarbonate standards.

9. An article comprising the thermoplastic composition according to claim 1.

10. The article according to claim 9, wherein the article is a housing for a personal or commercial electronics device.

11. The article according to claim 10, wherein the housing comprises the thermoplastic composition and an aluminum component, and wherein the thermoplastic composition is bonded to the aluminum component.

12. A method for making a thermoplastic composition, comprising:
   forming a mixture comprising from 40 wt % to 60 wt % polycarbonate homopolymer or copolymer, from 15 wt % to 30 wt % styrene acrylonitrile copolymer, from 13 wt % to 15 wt % flat glass fiber, and from 9 wt % to 11 wt % round glass fiber; and
   extruding or molding the mixture to form the composition,
   wherein the combined weight percent value of all components does not exceed 100 wt %, and all weight percentage values are based on the total weight of the composition.

13. The method according to claim 12, wherein the mixture comprises 50 wt % to 55 wt % polycarbonate homopolymer or copolymer, 20 wt % to 25 wt % styrene acrylonitrile copolymer, 14 wt % flat glass fiber and 10 wt % round glass fiber.

14. The method according to claim 12, wherein
   the composition has a coefficient of thermal expansion of from 23 to 27 micron per meter per degree Celsius (μm/m/° C.) as determined in accordance with ISO 11359, and the composition has a melt flow rate (MFR) of at least 35 cm³/10 min as tested in accordance with ISO 1133.

15. The method according to claim 12, wherein the polycarbonate homopolymer or copolymer has a molecular weight of 1,500 to 100,000 g/mol as determined by gel permeation chromatography (GPC) and calibrated to polycarbonate standards.

* * * * *